Patented Jan. 12, 1937

2,067,172

UNITED STATES PATENT OFFICE 2,067,172

CHEMICAL COMPOUNDS AND PROCESS FOR PREPARING SAME

Wallace Hume Carothers, Fairville, Pa., assignor to E. I. du Pont de Nemours & Company, Wilmington, Del., a corporation of Delaware No Drawing. Application March 6, 1933, Serial No. 659,833

23 Claims. (Cl. 260—6)

This invention relates to halogenation products of polymers of halogen substituted alpha, gamma-dienes and to articles and compositions made from such halogenated products. Specifically the invention pertains to the products produced by chlorinating polymerized chloro-2-butadiene-1,3.

It has been found that chloro-2-butadiene-1,3 may be made by the reaction of monovinylacetylene and hydrogen chloride in the presence of an aqueous solution of a cuprous chloride ammonium chloride catalyst (Carothers and Collins U. S. application 490,538, filed October 22, 1930). It has further been found that the chloro-2-butadiene-1,3 may be polymerized in the presence of light, heat, ozone, polymerization catalysts or other polymerizing influences to elastic rubber-like products (U. S. application 519,243, filed February 28, 1931). Furthermore, it has been found that chloro-2-butadiene-1,3 may be converted under suitable conditions to plastic polymers resembling unvulcanized rubber (Williams, U. S. application 519,244, filed February 28, 1931) and that chloro-2-butadiene-1,3 may be polymerized in the emulsified state to form a product similar to natural rubber latex (Collins U. S. application 537,484, filed May 14, 1931). The polymerization may also be carried out (with attendant alteration in the nature of the resulting products) in the presence of solvents (Carothers, Collins & Kirby U. S. application 519,241, filed February 28, 1931) or in the presence of certain inhibitors of polymerization (U. S. application 519,242, filed on the same day by the same inventors), or in the presence of sulfur and thiuramdisulfides (Carothers & Kirby U. S. application 535,577, filed May 6, 1931). Various homologs and analogs of chloro-2-butadiene-1,3 have also been discovered and found to undergo polymerization with the formation of products similar to those enumerated above for chloro-2-butadiene-1,3. These new compounds include bromo-2-butadiene-1,3 (see first cited application of Carothers and Collins and also U. S. application 537,492, filed May 14, 1931, by the same inventors), homologs of chloro-2-butadiene-1,3 having hydrocarbon radical in position 1, but having otherwise the same structure as cholor-2-butadiene-1,3 (Jacobson, U. S. application 569,633, filed October 19, 1931), and homologs of chloro-2-butadiene-1,3 having hydrocarbon groups in position 3 and/or 4 (Carothers and Coffman, U. S. application 569,823, filed October 19, 1931). The halogen containing dienes which may be halogenated under the conditions of the present invention contain the following nucleus:

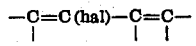

One object of the present invention relates to halogenation products of halogen substituted alpha, gamma-dienes, particularly chloro-2-butadiene-1,3 and processes for preparing same. A further object of the invention relates to the preparation of a synthetic rubber which will maintain its flexibility on long storage and under low temperature conditions. Another object of the invention comprises the preparation of new compositions of matter useful in the coating, impregnating, adhesive and moulding arts. Other objects of the invention will become apparent from the detailed description of the invention.

It has been found that these objects may be accomplished by the halogenation of polymers of the halogen substituted alpha, gamma-dienes as illustrated in the following examples:

Example 1

Thirty parts by weight of a plastic polymer of chloro-2-butadiene-1,3 of which the preparation is given below are dissolved in 250 parts by weight of chloroform. A rapid stream of chlorine gas is passed into this solution, which is maintained at substantially 45° C., for 1½ hours in the absence of direct sunlight and then allowed to stand at 20° C. for 16 hours. The resulting chlorinated polymer is isolated either by evaporating the solvent, preferably under reduced pressure, or by pouring the solution into alcohol, whereby the product is precipitated. Alternatively the chloroform solution of the chlorinated polymer may be used directly as a coating composition or for similar purposes to be described below.

The chlorinated product when isolated and freed from solvent is a pure white odorless solid which has considerable toughness and coherence and therefore cannot be readily ground to powder. It is soluble in chlorinated solvents such as chloroform, carbon tetrachloride, trichloroethylene and the like, in aromatic hydrocarbons such as benzene and toluene, and in esters such as butyl acetate, and, when deposited by the evaporation of the solvent, forms a hard, strong, pliable perfectly colorless and transparent film which is very resistant to the action of acids, alkalies, and certain solvents such as aliphatic hydrocarbons and which is not discolored by long exposure to sunlight. It contains approximately 68% of chlorine and therefore corresponds closely to the formula $(C_4H_5Cl_3)_x$. On the basis of the structure assigned to the polymer in the article appearing in J. Am. Chem. Soc. 53, 4203, 4208, (1931), it appears to result almost entirely from the addition of two atoms of chlorine to each double bond present in the original polymer of chloro-2-butadiene-1,3. Except at considerably elevated temperatures and in the presence of catalysts or catalyzing radiations, substitution of hydrogen by chlorine takes place only to a very small extent.

The solution of a chlorinated polymer may be used as a coating composition or for the making of transparent sheets and foils, either alone or with the addition of other film materials. For example, the films may be made more flexible by the addition of softeners such as castor oil or dibutyl phthalate. A hard and very adhesive film may be made by dissolving 10 parts of the chlorinated polymer in 30 parts of butyl acetate and adding to this a butyl acetate solution containing 1 part of a modified glyceryl phthalate resin containing 65% of glyceryl phthalate and 35% of combined China-wood oil acids. Other resins both natural and synthetic may likewise be used.

By modifying the above chlorination procedure, products containing smaller amounts of chlorine than present in the product above may readily be obtained as illustrated in the following example. Thus, by limiting the extent of chlorination either by limiting the amount of chlorine furnished to the reaction or by interrupting the chlorination at some point short of that required for the saturation of the double bonds, products may be made containing between 68 and 40% chlorine, the latter figure representing the chlorine content of the unchlorinated chloro-2-butadiene-1,3 polymer. The following example illustrates the preparation of a slightly chlorinated product.

Example 2

Eleven parts by weight of the plastic polymer used in Example 1 are dissolved in approximately 60 parts by weight of carbon tetrachloride and to this solution is added slowly 30 parts by weight of carbon tetrachloride containing ¼ part of dissolved chlorine. The mixture is allowed to stand for ½ hour at the ordinary temperature in the absence of direct sunlight. The product is then separated by precipitation with alcohol as in Example 1. After the residual alcohol and carbon tetrachloride have been removed by evaporation, preferably while the material is being worked on the rolls of a rubber mill, a plastic material similar to unvulcanized natural rubber and to the original polymer of chloro-2-butadiene-1,3 remains. This may now be made into shaped elastic articles by procedures similar to those used in the case of natural rubber. Pigments, fillers, and antioxidants may be incorporated, the plastic mass formed into desired shape, and finally rendered elastic and non-plastic by heating, for example, for 90 minutes at 130–40° C. The resulting product retains its flexibility even on long storage at low temperatures and is very resistant to the destructive action of ozone and of hydrocarbon solvents such as gasoline. It will be noted that, unlike natural rubber, no sulfur or other vulcanizing agent or accelerator need be added to convert it to the elastic state. It has been found desirable, however, to add antioxidants, such as phenyl-beta-naphthylamine or similar compounds well known in the rubber art, and also basic substances, such as zinc oxide, that are capable of combining with traces of hydrogen chloride which may be given off during the aging of the polymer.

A product very similar in physical properties to that of the above example results if one half part of chlorine is used instead of one quarter part. As the amount of added chlorine is increased beyond this point, however, the resulting products become more and more difficult to convert by heat into the elastic. insoluble condition and when so converted are deficient in strength and elasticity. Hence they become less suitable for use in place of rubber. On the other hand, the solubility of these chlorinated polymers increases with the chlorine content and hence the more highly chlorinated products are more suitable for certain types of coating compositions. Such a product has already been described in Example 1. Products which contain more chlorine than this and in which part of the hydrogen of the original polymer may be made by chlorination in the presence of chlorination catalysts such as iodine, sulfur, or ferric chloride or in the presence of direct sunlight or other source of ultra-violet light. A typical reaction is illustrated in the following example.

Example 3

A solution of the plastic polymer such as used in Example 1 is prepared in carbon tetrachloride, treated with an excess of chlorine, and exposed to the ultraviolet light of a mercury vapor lamp for 120 hours. The product then isolated by evaporation of the solvent or precipitation with alcohol is a pure white odorless powdery solid containing approximately 74% of chlorine, corresponding to the addition to each chloro-butadiene unit of the polymer of two chlorine atoms and the replacement of one hydrogen atom by a third atom of chlorine.

Still more highly chlorinated products may be obtained by the use of more vigorous conditions such as higher temperatures, chlorination catalysts, and longer treatment. On the other hand products with the chlorination intermediate between that of the products of Examples 1 and 3 may be made, for instance by carrying out the chlorination described in Example 3 for only 24 hours, whereby a product containing approximately 70.5% of chlorine is obtained.

The plastic polymer referred to in Examples 1 to 3 is made by allowing freshly distilled chloro-2-butadiene-1,3, to stand in contact with air at an ordinary, or at slightly elevated temperature, until it has become so viscous as to pour with very great difficulty. This stage is usually reached after about thirty-six hours. The viscous mass is then washed with a large volume of alcohol with stirring and mixing. It is finally freed from the residual alcohol and unchanged chloro-2-butadiene-1,3 by working upon the rolls in the rubber mill.

Plastic polymers somewhat different in character and in mode of preparation may be used in lieu of the polymer described in the preceding paragraph. Thus the plastic polymers prepared according to the process described in the Williams application and in the Carothers, Collins and Kirby applications, identified above, may be chlorinated in accordance with the present invention, for example, chlorination of the plastic polymers prepared by polymerizing chloro-2-butadiene-1,3, in the presence of sulfur, iodine and trinitrobenzene yields satisfactory products. Solutions of the plastic polymers resulting directly from the procedure outlined in the Carothers, Collins and Kirby case, as cited above, may be chlorinated directly, instead of first separating the polymer and then disssolving in a suitable solvent..

The following example illustrates the chlorination of an elastic, non-plastic type of polymer which is insoluble in common organic solvents and the preparation of which is described below:

Example 4

Fifty parts by weight of elastic polymer are suspended in 1500 parts by weight of carbon tetrachloride which causes the polymer to swell considerably without, however, dissolving. Chlorine is then passed into this suspension of swollen polymer in carbon tetrachloride which is simultaneously exposed to ultra-violet light. After 30 hours the polymer has completely reacted and there results a viscous solution of chlorinated polymer containing a certain amount of insoluble chlorination product which is removed by filtration. The soluble chlorinated product may be isolated in the form of either a film or a powder by the methods given in the above examples. The product contains approximately 71% chlorine and is harder and less soluble than the corresponding product prepared from the plastic ploymer.

The chlorination of the elastic polymer may also be carried out by continuously masticating it in the presence of chlorine with or without the addition of solvent or simply by exposing the polymer to gaseous chlorine in the form of thin sheets or shreds.

The elastic polymer referred to above is obtained by allowing the chloro-2-butadiene-1,3 to stand as above until it has become a hard, flexible mass containing practically no unchanged diene. This usually requires about 14 days. Many alternative methods for the preparation of the elastic type of polymer are given in the above cited applications.

Numerous variations in carrying out this invention are included within its scope. Thus as regards starting materials, bromine, iodine, or other halogens or mixed halogens such as iodine chloride, or substances which readily decompose to give halogen such as cyanogen chloride may be used instead of chlorine while on the other hand polymers of any of the polymerizable halogen substituted alpha, gamma-dienes such as those disclosed in the above cited applications may serve as the substance to be halogenated. Furthermore, I may use any of the polymers of these dienes provided that they are capable of dissolving in or being swollen by solvents. These polymers may be prepared by any of the methods described in the above cited applications. The halogenation itself may be carried out at any temperature from 0° C. or below up to the temperature at which substantial decomposition of the polymer takes place (above 200° C.). It may be carried out in some cases by simply exposing the polymer to the halogen without a solvent although in general the use of a solvent is more convenient. As solvents we may use any that are capable of dissolving or swelling the polymer and are not capable of reacting with the halogen under the conditions of the experiment. Thus chlorinated solvents, such as chloroform, carbon tetrachloride, and trichloroethylene, or aromatic hydrocarbons, such as benzene and toluene, may be used. The concentration of halogen, the temperature and duration of the reaction are capable of wide variation and may be chosen so as to give a greater or less degree of halogenation as desired. Where extensive halogenation is desired, catalysts such as sulfur, iodine, and iron salts may be used to advantage or the reaction may be carried out in the presence of light, particularly ultraviolet light.

The products of the invention may be used for a wide variety of purposes depending upon their properties. Products in which a relatively small amount of halogen has been introduced as in Example 2 are very similar to unvulcanized natural rubber and hence may be used for practically all purposes for which natural rubber is used. Thus tires, tubing, sheets, insulated wire, and similar articles known in the industry as mechanical goods may be made from the slightly halogenated product by processes similar to those used for the fabrication of natural rubber. These steps consist of the incorporation of pigments, fillers, and antioxidants by means of a rubber mill, formation of the resulting plastic mass by pressure to the desired shape, and finally heating to convert to the elastic, non-plastic form. Thin-walled articles may be made by dipping a suitable mold into a solution of the chlorinated polymer, for example in benzene, with or without the addition of pigments, fillers, dyes, antioxidants, etc., allowing the adhering film to dry and repeating until coating of the desired thickness has been obtained and thereafter heating to convert into the elastic form and finally removing from the mold. Solutions may also be used for impregnating and water-proofing cloth, thread, paper, and the like and also as cements and coating compositions. In all cases the resulting products are fully equal to those made from natural rubber in all significant properties such as strength, water resistance, and aging qualities and are more resistant to the action of ozone and of hydrocarbon solvents, such as gasoline. Furthremore, since no sulfur or other vulcanizing agent or accelerator is required, the process of manufacture is simpler than in the case of natural rubber and the products are free from the objectionable color, odor and taste which is often conferred by sulfur compounds. In addition the slightly chlorinated polymers are superior to the unchlorinated chloro-2-butadiene-1,3 polymers in that they do not become stiff even on long storage at low temperature.

The product may be produced in a porous spongy or fibrous form by evaporating a solution of chlorinated chlorobutadiene polymer by contact with an agitated liquid which is immiscible with the solvent and with the solid product and which is maintained at a temperature above the boiling point of the solvent under the conditions of working. Thus a solution of chlorinated chlorobutadiene polymer in carbon tetrachloride may be run or blown into a volume of boiling water which is maintained in a suitable state of agitation and at the required temperature by blowing in steam. If desired a basic substance may be added to the water to neutralize the hydrochloric acid and to retain any small amount of chlorine which may be present. The evaporated solvent is recovered in any suitable manner from the vapors, for example, by condensation and separation from the water which is simultaneously condensed.

Before the evaporation of the solvent an oil-soluble dye or plasticizing agent may be incorporated with the solution of chlorinated rubber in order to obtain a colored final product or one uniformly incorporated with the plasticizing agent.

The products thus obtained are in a porous, spongy or fibrous condition suitable for many purposes and having the advantage that they dissolve very readily in solvents for the production of varnishes, lacquers, water-proofing liquids, films or fibers.

To obtain the product in the most desirable porous, spongy or fibrous form, it is desirable that the solution of chlorinated polymer of chloro-2-butadiene-1,3 be introduced at such a distance below the surface of the liquid that no solution reaches the surface of the heated liquid, since if the chlorinated polymer reaches the surface of the heated liquid in the form of solution an inferior product may be obtained. The solution should therefore be introduced into the body of the heated and agitated liquid at such a distance below the surface and at such a rate that substantially all of the solvent is removed from the chlorinated polymer before it has reached the surface of the liquid.

More extensive halogenation leads to products which are no longer elastic like rubber but are hard and tough. They are, therefore, particularly useful as the principal ingredients of coating compositions and impregnating solutions and for the making of transparent sheets and foils. They may be used either alone or in admixture with other film materials as already described and may if desired be mixed with dyes or pigments according to the procedures well known in the art. Since the chlorinated polymers are light in color and give films of high luster, their compositions are suitable for decorative purposes while their high resistance to corrosive materials such as acids, alkalies, and solvents make them useful in protective coatings as well. Many of the more highly halogenated products are also suitable for the production of hard, molded articles by the methods known to the art such as are used for phenol-formaldehyde resins and the like.

The above description and specific examples are given by way of illustration and the invention is not to be limited thereby. Any variation therefrom which conforms to the spirit of the invention is intended to be included within the scope of the claims.

I claim:

1. Halogenated polymer of an alpha, gamma-diene containing a single halogen atom in the molecule.

2. Halogenated polymer of a halogen containing alpha, gamma-diene containing the nucleus

3. The product described in claim 2 in which the halogen atom is chlorine.

4. A chlorinated polymer of chloro-2-butadiene-1,3.

5. The product described in claim 4, characterized in that the polymer is obtained by chlorinating a plastic polymer.

6. The product described in claim 4, characterized in that the polymer is obtained by chlorinating an elastic polymer.

7. The process which comprises halogenating a polymer of a halogen containing alpha, gamma-diene containing the nucleus

8. The process which comprises halogenating a polymer of a chlorine containing alpha, gamma-diene containing the nucleus

9. The process which comprises halogenating a polymer of chloro-2-butadiene-1,3.

10. The process which comprises chlorinating a polymer of chloro-2-butadiene-1,3.

11. The process which comprises reacting chlorine with a polymer of chloro-2-butadiene-1,3 in solution.

12. The process of claim 7, characterized in that the reaction is carried out in solution.

13. A process for modifying the resistance to stiffening or freezing of synthetic rubber derived from chloro-2-butadiene-1,3 which comprises causing the polymerized chloro-2-butadiene-1,3 to combine with 0.5–5.0% of its weight of chlorine.

14. A rubber-like chlorinated polymer of chloro-2-butadiene-1,3 containing more than 40.1% of combined chlorine.

15. A chlorinated polymer of chloro-2-butadiene-1,3 in the form of a coherent film.

16. A halogenated polymer of a halogen-2-butadiene-1,3.

17. A chlorinated polymer of chloro-2-butadiene-1,3 containing from 68% to 75% of combined chlorine.

18. The process which comprises passing a stream of chlorine gas through a solution of chloro-2-butadiene-1,3 plastic polymer in chloroform at a temperature of 45° C. for 1½ hours in the absence of direct sunlight, allowing the resulting material to stand at 20° C. for 16 hours and thereafter removing the solvent.

19. The process which comprises adding 0.5 to 5.0% of chlorine, dissolved in carbon tetrachloride, to a plastic polymer of chloro-2-butadiene-1,3 dissolved in about six times its weight of carbon tetrachloride, allowing the mixture to stand for ½ hour at ordinary temperature in the absence of direct sunlight and thereafter removing the solvent.

20. The process which comprises halogenating a polymer of a halogen containing alpha, gamma-diene containing the nucleus

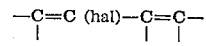

in the presence of a solvent for the halogen containing polymer and thereafter separating the solvent from the halogenated polymer.

21. The process which comprises halogenating a polymer of a halogen containing alpha, gamma-diene containing the nucleus

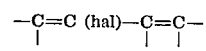

in the presence of a solvent for the halogen containing polymer and thereafter passing the reaction mass into a liquid immiscible both with the solvent and with the chlorinated polymer, maintained at a temperature above the boiling point of the solvent, said solution being introduced at such a distance below the surface of the liquid, and at such a rate that the polymer is separated from the solvent before the solvent reaches the surface of the heated liquid.

22. A product obtainable by the process of claim 21.

23. A chlorinated polymer of chloro-2-butadiene-1,3 in the form of a coherent film, said chlorinated polymer having combined with it 0.5 to 5.0%, by weight, of chlorine, based on the weight of the polymer before chlorination and in addition to the weight of chlorine present in the polymer before chlorination.

WALLACE H. CAROTHERS.